United States Patent [19]

Takahashi et al.

[11] Patent Number: 5,008,308
[45] Date of Patent: Apr. 16, 1991

[54] THERMAL ADHESIVE COATING COMPOSITION BASED ON EPOXY RESIN, HIGH TG POLYMER, AMINE CURING AGENT AND FILM FORMING AGENT

[75] Inventors: Teruyuki Takahashi, Ashiya; Mitsuru Kohno, Sanda, both of Japan

[73] Assignee: Kawasaki Steel Corp., Hyogo, Japan

[21] Appl. No.: 312,883

[22] Filed: Feb. 17, 1989

[51] Int. Cl.$^5$ ............................................. C08L 63/00
[52] U.S. Cl. .................................... 523/406; 523/410; 523/412
[58] Field of Search .................... 523/406, 410, 412

[56] References Cited

U.S. PATENT DOCUMENTS

| | | | |
|---|---|---|---|
| 2,844,557 | 7/1958 | Welch | 523/406 |
| 2,872,427 | 2/1959 | Schroeder | 523/412 |
| 3,806,483 | 4/1974 | Juba et al. | 523/412 |
| 3,904,575 | 9/1975 | Satokawa et al. | 523/406 |
| 3,945,964 | 3/1976 | Hastings et al. | 523/412 |
| 4,255,311 | 3/1981 | Eldin et al. | 523/412 |
| 4,293,476 | 10/1981 | Moore et al. | 523/410 |
| 4,377,433 | 3/1983 | Merz et al. | 523/412 |
| 4,431,689 | 2/1984 | Günter | 523/406 |
| 4,522,962 | 6/1985 | Abbey et al. | 523/410 |
| 4,524,107 | 6/1985 | Marchetti et al. | 523/412 |
| 4,588,757 | 5/1986 | Minnis et al. | 523/406 |
| 4,696,957 | 9/1987 | Adeney et al. | 523/406 |

FOREIGN PATENT DOCUMENTS

| | | | |
|---|---|---|---|
| 659752 | 3/1963 | Canada | 523/406 |
| 0056452 | 7/1982 | European Pat. Off. | |
| 0058132 | 5/1975 | Japan | 523/412 |
| 0096073 | 6/1982 | Japan | 523/406 |
| 533620 | 10/1976 | U.S.S.R. | 523/406 |
| 0655683 | 4/1979 | U.S.S.R. | 523/412 |
| 777052 | 6/1957 | United Kingdom | 523/406 |

*Primary Examiner*—Earl Nielsen
*Assistant Examiner*—Frederick Krass
*Attorney, Agent, or Firm*—Bierman and Muserlian

[57] ABSTRACT

Thermal adhesive type coating composition including (A) an emulsion of a thermoplastic synthetic resin having a glass transition temperature of not lower than 60° C., (B) an emulsion of an epoxy resin, (C) an amine base curing agent for the epoxy resin which is capable of reacting with the component (B) when heated, and (D) a film forming assistant agent having solubility in water at 20° C. of not higher than 20 g/100 cc and having solubility therein of water at 20° C. of not lower than 0.5 g/100 cc, the weight ratio of the solid resin contents of the component (A) to those of the component (B) being 60/40 to 98/2, is disclosed. The composition protects a substrate coated with the composition as the coating at ambient temperature and, when heated under pressure application, causes the substrates coated with the composition to be bonded to each other with a strong adhesive strength.

2 Claims, No Drawings

THERMAL ADHESIVE COATING COMPOSITION BASED ON EPOXY RESIN, HIGH TG POLYMER, AMINE CURING AGENT AND FILM FORMING AGENT

BACKGROUND OF THE INVENTION

This invention relates to a Thermal adhesive type coating composition having simultaneously the function of a protective material when the coating is applied to the surface of a variety of base materials, such as metals, plastics or inorganic materials, and the function of an adhesive having a strong adhesive strength when the composition is applied to the surfaces of two of the base materials and the coated surfaces of these base materials are applied to each other under heating and pressure application at a desired later time after the formation of the coatings.

For protecting and improving the aesthetic aspect of a variety of base materials, a variety of paints have been employed, while a variety of adhesives have also been employed extensively for bonding two base materials to each other.

However, there has scarcely been known a composition having not only the function of protecting the base material but also the function of bonding two base materials to each other. The practical merit would be outstanding if these two functions could be realized in the same composition. For example, in the case of a pre-coated metal (PCM), the paint is previously applied before processing the metal plate. This PCM is cut to size and worked or processed by welding or bonding to produce an ultimate assembled product.

However, since the coated metal plate is welded, problems are presented in that toxic gases may be produced due to burning of the coating at the time of welding, or only an insufficient bonding strength may be produced. The bonding by the adhesive also suffers from the drawback that the operation of applying the coating is highly complex, while only an insufficient bonding strength may be produced due to the presence of the coating. When the paint is applied after the working or assemblying for obviating these inconveniences, the metal sheets may be rusted while being left before processing. When the paint is applied after working or processing, the coating efficiency may be lowered significantly due to the complex shape of the products.

The present inventors have conducted eager researches towards overcoming these problems and arrived at a composition having not only the function of a protective material for affording an aesthetic appearance and durability such as the corrosion resistance, waterproof and resistance to chemicals, to a base material coated with the composition, but also the function of bonding two base materials coated with the composition to each other when these base materials are applied to each other under heating and pressure application. This finding has led to fulfillment of the present invention.

SUMMARY OF THE INVENTION

It is a primary object of the present invention to provide a thermal adhesive type coating composition which is capable of endowing a variety of base materials having thermal resistance and strength with the functions or properties possessed by the conventional paints, such as aesthetic appearance, corrosion resistance, waterproof and resistance to chemicals, when the coating composition is applied to these base materials, and which is also capable of developing a strong adhesive strength when the base materials are stacked one upon the other, with the sides of the base materials previously coated with the coating composition being applied to each other under heating and pressure application at a desired later time after coating.

In accordance with the present invention, there is provided a thermal adhesive type coating composition comprising
(A) an emulsion of a thermoplastic synthetic resin having a glass transition temperature of not lower than 60° C.,
(B) an emulsion of an epoxy resin,
(C) an amine base curing agent for the epoxy resin, said curing agent being capable of reacting with said component (B) when heated, and
(D) a film forming assistant agent having solubility in water at 20° C. of not higher than 20g/100cc and having solubility therein of water at 20° C. of not lower than 0.5g/100cc, the weight ratio of the solid resin contents in said component (A) to those in said component (B) being 60/40 to 98/2.

DETAILED DESCRIPTION OF THE INVENTION

When applied on the surface of a variety of inorganic base materials or substrates exhibiting thermal resistance, such as metal, plastics, ceramics, glass or slates, the coating composition of the present invention is forcibly dried under heating for a shorter time or at ambient temperature to form a coating layer, similarly to the conventional emulsion paint. It is noted that, at this stage, the epoxy group in the epoxy resin as the component (B) in the coating layer exists in substantially non-reacted state.

Then, if necessity arises, and at any desired time, the coated surfaces of the substrates are heated to about 150 to 500° C. and applied to each other under pressure. Because of the presence of the amine based curing agent for the epoxy resin, the curing agent and the epoxy resin undergo a cross-linking reaction, or the epoxy resin undergoes a self-cross-linking reaction, as a result of which the substrates can be unified strongly to each other.

As the thermoplastic synthetic resin emulsion, which is employed as the component (A) in the present invention, the emulsions of resins employed in the customary normally dry type emulsion paints, such as, for example, poly(meth)acrylate copolymer, polyvinyl acetate copolymer, polyvinyl - butyral copolymer, polyvinyl chloride copolymer or a polyvinylidene chloride copolymer, may be employed, provided that the resin emulsions employed do not react with the components (B) or (C) as later described. Among these, an emulsion of the poly(meth)acrylate copolymer is most preferred in the present invention because it has excellent compatibility with the component (B) and allows a wide range of selection in selecting the pysical properties of the resin.

The emulsion of the poly(meth)acrylate copolymer has a molecular weight of the order of 20,000 to 300,000 and is prepared by the customary emulsion polymerization of one or more monomers selected from the group consisting of an ester of acrylic acid with an alkyl alcohol having 1 to 8 carbon atoms, an ester of methacrylic acid with an alkyl alcohol having 1 to 8 carbon atoms, acrylic acid, methacrylic acid, hydroxyethyl methacrylate and styrene, wherein the alkyl group in the alkyl alcohol may typically be methyl, ethyl, n-butyl, isobutyl, ethylhexyl or propyl.

It is necessary for the emulsion of the thermoplastic synthetic resin as the component (A) to have a glass transition temperature Tg of not lower than 60° C.

The temperature Tg lower than the above range is not desirable since the produced coating layer remains to be tacky so that a so-called blocking phenomenon is likely to occur when a number of substrates are stacked one upon the other with the result that the coating layers or even the substrates may be damaged. Although the upper limit of the temperature Tg may vary in dependence upon the kind or the amount of the film forming assistant agent, the temperature of not higher than 200° C. is usually preferred.

The epoxy resin emulsion as the component (B) is employed in the present invention for improving rust-proofing properties and the intimate bonding of the coating layer with respect to the substates and for strongly bonding the substrates to each other as a result of the cross-linking reaction with the component (C) as later described at the time of the bonding under heating and pressure application.

The epoxy resin is liquid or solid at ambient temperature and contains two or more epoxy groups in each molecule. More specifically, it is produced by reacting polyalcohols or polyphenols with halohydrine and may be enumerated by bisphenol A-, halogenated bisphenol A-, novolac-, polyglycol- or bisphenol F-type resins or epoxidized oil.

Preferably, the epoxy resin has an epoxy equivalent of 200 to 1,000 and a solid type epoxy resin at ambient temperature in consideration of its anti-blocking properties may be used.

The epoxy resin is marketed under the trade names of Epicoat #828, #1001, #1004 and #1007 by the Shell Chemical Inc.; D.E.R.511-A80 and 732 by the Dow Chemical Inc.; YD-011, 001, 001Z, 012 and 014; ST-5080 and 5100; YDCN-701, 702, 703 and 704; and YDPN-638 by the Tohto Kasei Co. Ltd.

The epoxy resin emulsion is produced by forcedly emulsifying these epoxy resins in the presence of an emulsifying agent, as conventionally. As the emulsifying agent, it is preferred to use a polyoxyethylene alkyl phenol ether type nonionic surfactant, polyoxyethylene polyoxypropylene block polyethers or an adduct thereof with diisocyanate compounds, either singly or as a mixture.

Concerning the amine-base curing agent for the epoxy resin employed as the component (C) in the present invention, it is required of this curing agent that the composition of the present invention containing the component (C) does not undergo gellation or thickening on storage at ambient temperature, that the component (C) does not react substantially with the component (B) after the coating formed from the composition is allowed to stand at ambient temperature for a prolonged time of, for example, one year, and that the component (C) undergoes cross-linking with the component (B) or causes the self-cross-linking of the component (B) at the time of the bonding under pressure and heating at approximately 150 to 500° C.

Examples of the curing agent include dicyandiamide, N-aminoethyl piperazine, piperidine, heterocyclic amines, such as that sold under the trade name of "Epomate" by the Ajinomoto Co. Ltd., hexamethylenetetramine, triethylamine, triethanolamine, 4, 4'-methylene dianiline, triethylenediamine, imidazoles and imidazoline derivatives.

In accordance with the present invention, the substrates coated by the composition of the present invention containing the component (C) may be bonded strongly to each other by applying the substrates to each other under application of a pressure of 1 to 50 kg/cm$^2$ and at a temperature of about 150 to 500° C.

The film forming assistant agent as the component (D) is employed in the present invention for plasticizing and promoting the fusion between the resin particles of the components (A) and (B) and for assisting in forming a smooth coating free of cissings. Although it has been known to use a variety of film forming assistant agent in paint emulsions, it has now been found that these favorable effects may be displayed when the film forming assistant agent employed in the present invention has a solubility of the film forming assistant agent in water at 20° C. of not higher than 20g/100cc and a solubility of water in the film forming assistant agent at 20° C. of not less than 0.5g/100cc.

With the solubility of the film forming assistant agent in water higher than the above range, the produced coating is subject to defects such as cissings. With the solubility of water in the film forming assistant agent lower than the above range, the produced film is subject to thickening and separation and poor in storage stability due to poor compatibility of the film forming assistant agent with the other components.

Preferably, the film forming agent has the boiling point of not lower than 100° C.

Examples of the film forming assistant agents include 2,2,4-trimethyl-1,3-pentanediol monoisobutyrate, butylcarbitol acetate, octylene glycol, 3-methoxybutyl acetate, 2-ethylhexyl acetate, isobutyl alcohol, n-butyl alcohol, amyl alcohol, benzyl alcohol, pentyl alcohol or a mixture thereof.

The coating composition of the present invention is composed essentially of the components (A) to (D) and may be added to by a variety of additives, such as colored pigments, extender pigments, rust preventive pigments or defoaming agents, surface conditioners, thickeners, pigment dispersing agents or antiseptic agents.

In the coating composition of the present invention, the weight ratio of the solid resin contents of the component (A) to those of the components (B) is preferably 60/40 to 98/2 and preferably 70/30 to 95/5. With the contents of the component (B) lesser than the above range, the cross-linking density following the bonding under heating and pressure application is low so that the force of cohesion and hence the adhesive strength are low. In addition, the coating is likely to be peeled off when the pressure is released while as yet the coating is not cooled sufficiently after the pressure bonding under heating. Conversely, with the contents of the component (B) higher than the above range, the properties of the coating before the pressure bonding under heating are lowered. In addition, should a long time elapse since the application of the coating until the pressure bonding under heating, the cross-linking reaction takes place only gradually such that the desired bonding strength cannot be evolved at the time of pressure bonding under heating.

In consideration of the coatability and the function proper to the coating, the total solid resin contents of the components (A) and (B) are preferably of the order of 20 to 50% by weight based on the total weight of the composition.

The contents of the component (C) are preferably so selected that the amino group equivalent in the composition (C) is 0.6 to 1.5 to 1 equivalent of the epoxy group in the compoent (B). With the contents of the component (C) in this range, a sufficient cross-linking and hence the desired bonding strength can be derived as the result of the pressue bonding under heating.

The contents of the component (D) is preferably 1.0 to 15% by weight based on the total weight of the solid resin contents, of the components (A) and (B), although they may vary depending upon the kinds or concentrations of the resins. With the above contents, the function of the film forming assitant agent can be displayed without lowering the coating performance.

The coating composition of the present invention can be used for pressure bonding under heating and, when applied to a variety of substrates having thermal resistance and strength, is able to afford the functions possessed by the conventional paints, such as aesthetic appearance, corrosion resistance, waterproof and resistance to chemicals, to these substrates. In addition, a strong adhesive strength can be developed only by stacking the surfaces to be bonded together and applying a pressure thereto under heating at any desired time.

Thus, when the substrates are unified to each other, the step of welding and the step of coating an adhesive may be eliminated for achieving the safety and saving of process steps while reducing manufacture costs.

The present invention will be explained in more detail hereinbelow with reference to Examples. In these Examples, parts and percentages (%) are expressed by those based on weight.

Thermoplastic Synthetic Resin Emulsion

A set of emulsions (i) to (iv) were prepared from the monomer compositions shown in Table 1 by the conventional emulsion polymerization method in water.

As an emulsion (v), a polyvinyl butyral resin emulsion produced by the Denki Kagaku Kogyo KK under the trade name of "BE 40" (Tg, 60 to 90° C.; NV(solid contents), 50%) was employed.

TABLE 1

| Monomers | emulsion Nos. | | | |
|---|---|---|---|---|
| | (i) | (ii) | (iii) | (iv) |
| methyl methacrylate | 98 | 75 | — | 50 |
| styrene | — | — | 98 | — |
| hydroxyethyl-methacrylate | — | 7 | — | — |
| acrylic acid | 2 | 3 | 2 | 5 |
| ethyl acrylate | — | 15 | — | 45 |
| resin Tg(°C.) | 105 | 75 | 100 | 35 |
| solid contents of emulsion | 40 | 40 | 40 | 40 |
| | (in parts by weight) | | | |

Epoxy Resin Emulsion

A set of commercially available epoxy resin emulsions shown in Table 2 was employed.

TABLE 2

| Nos. | Types of resins | Trade name | produced by | Epoxy equivalent (g/q) | Emulsion solid content (wt %) |
|---|---|---|---|---|---|
| a | bisphenol A type | YUKARESIN E1022 | YOSHIMURA OIL CHEMICAL Co., LTD. | 460–495 | 55% |
| b | bisphenol A type | EPOSOL B341 | CHUKYO OIL AND FATS CO., LTD. | 340 | 70% |
| c | novolac type | AQUATHOT 5003 | TOHTO KASEI CO., LTD. | 205 | 55% |

EXAMPLES 1 TO 8 AND COMPARATIVE EXAMPLES 1 TO 6

A set of thermal adhesive type coating compositions were prepared by stirring and mixing the components shown in Table 3 at the part by weight ratios indicated therein. These coating compositions were sprayed on a ground and polished mild steel sheet of 0.8×75×150 mm according to JIS G 3141 to a dry film thickness of approximately 10 μm, and were forcedly dried at 80° C. for ten minutes.

The produced coated sheets were tested for the appearance, resistance to blocking, salt spray corrosion resistance and adhesive strength. The results are shown in the lowermost column of Table 3.

The tests were conducted in the following manner.

Appearance of the coating: The produced coatings were appraised visually. The coatings that are free from cissings, foams, grains, streaks or haze and are smooth were appraised as satisfactory (O) and those showing coating defects, such as were appraised to be unsatisfactory (X).

Resistance to Blocking: The coated sheets cut to a size of 40×40 mm were stacked so that the coated sides face to each other. A cushioning material and an aluminum plate were attached to the outer sides of the sheets and the resulting specimen was pressured by a vice to a pressure of 10 kg/cm2. After allowed to stand at 80° C. for 24 hours, the specimen was checked for the possible presence of blocking. The specimen free of blocking was appraised to be satisfactory (O) and the specimen exhibiting blocking was appraised to be unsatisfactory (X).

Salt-spray corrosion resistance: Tests were conducted in accordance with JIS Z 2371. The coating layer free of unusualities was appraised to be satisfactory(O) and that in which spot rusting and swelling occurred was appraised to be unsatisfactory(X).

Adhesive test (I): Two coating sheets which had been allowed to stand for one month at ambient temperature were cut to a size of 20×50 mm and stacked one upon the other so that the 20×10 mm portion of the coated sides contact each other. The sheets were bonded together under a pressure of 10 kg/cm² and at 200° C. for 70 seconds. The tensile shear strength of the test samples thus bonded to each other was measured using an "autograph S-2000C" manufactured by the Shimazu Seisakusho KK.

Adhesive test (II): The coated test samples were aged at 80° C. for 48 hours and bonded to each other under heating and pressure in the same way as for Adhesive test (I) and the tensile shear strength of the produced specimen was measured.

It is noted that the solubility of the component (D) in Table 3 in water at 20° C., expressed in g/100cc and the solubility of water in the component (D) at 20° C., expressed in g/100cc, are as follows:

|  | Solubility in water g/100 cc | Solubility of water g/100 cc |
|---|---|---|
| (*1) | 4.2 | 11.7 |
| (*2) | 6.5 | 3.7 |
| (*3) | ∞ | ∞ |
| (*4) | 0.1> | 0.1> |
| (*5) | 18 | 18 |
| (*6) | 23 | 6.5 |

| | Composition | | | | | | | | Component (C) | | Component (D) | | | |
|---|---|---|---|---|---|---|---|---|---|---|---|---|---|---|
| | Component (A) | | | | | Component (B) | | | Hexa-methylene tetramine | Triethyl-amine | Octylene glycol (*1) | Butyl arbitol acetate (*2) | Ethylene glycol monobutyl ether (*3) | Toluene (*4) |
| | i | ii | iii | iv | v | a | b | c | | | | | | |
| Example 1 | 100 | | | | | 8 | | | 0.3 | | 10 | | | |
| Example 2 | 100 | | | | | 8 | | | 0.3 | | | 10 | | |
| Example 3 | | 100 | | | | 31 | | | 1.2 | | 8 | | | |
| Example 4 | | 100 | | | | 8 | | | 0.3 | | 6 | | | |
| Example 5 | | | 100 | | | | 6 | | | 0.7 | | 5 | | |
| Example 6 | | | 100 | | | | | 8 | 0.8 | | | 10 | | |
| Example 7 | | | | | 100 | 16 | | | | 0.4 | | 10 | | |
| Example 8 | 100 | | | | | 8 | | | 0.3 | | | | | |
| Comparative Example 1 | | | | 100 | | 8 | | | 0.3 | | | 10 | | |
| Comparative Example 2 | 100 | | | | | 8 | | | 0.3 | | | | 10 | |
| Comparative Example 3 | 100 | | | | | 8 | | | 0.3 | | | | | 5 |
| Comparative Example 4 | 100 | | | | | 73 | | | 2.9 | | 10 | | | |
| Comparative Example 5 | 100 | | | | | | | | | | | 10 | | |
| Comparative Example 6 | 100 | | | | | 8 | | | 0.3 | | | | | |

| | Composition | | Water | Component A/ component B (ratio of solid contents) | Test item | | | Tensile shear strength (I) (kg/cm²) | Tensile shear strength (II) (kg/cm²) |
|---|---|---|---|---|---|---|---|---|---|
| | Component (D) | | | | | | | | |
| | T-pentyl alcohol (*5) | Ethylene glycol monoethyl ether (*6) | | | Appearance of coating | Resistance to blocking | Salt spray corrosion resistance | | |
| Example 1 | | | 3 | 90/10 | O | O | O | 157 | 143 |
| Example 2 | | | 3 | 90/10 | O | O | O | 149 | 127 |
| Example 3 | | | 12 | 70/30 | O | O | O | 142 | 105 |
| Example 4 | | | 3 | 90/10 | O | O | O | 155 | 130 |
| Example 5 | | | 4.5 | 90/10 | O | O | O | 144 | 132 |
| Example 6 | | | 3 | 90/10 | O | O | O | 148 | 122 |
| Example 7 | | | 3 | 85/15 | O | O | O | 129 | 124 |
| Example 8 | 10 | | 3 | 90/10 | O | O | O | 131 | 122 |
| Comparative Example 1 | | | 3 | 90/10 | O | X | O | 125 | 124 |
| Comparative Example 2 | | | 3 | 90/10 | X | O | X (spot rusting) | 109 | 105 |
| Comparative Example 3 | | | 3 | 90/10 | X | O | X (spot rusting) | 120 | 120 |
| Comparative Example 4 | | | 27 | 50/50 | O | O | O | 142 | 5 |
| Comparative Example 5 | | | | 100/0 | O | O | X (swelling) | 8 | 12 |
| Comparative Example 6 | | 10 | 3 | 90/10 | X | O | X (spot rusting) | 125 | 120 |

It may be seen from Table 3 that the composition of the present invention exhibits a superior coating performance and a superior adhesive strength following the bonding under heating and pressure application.

On the other hand, the composition of the Comparative Examples employing the thermoplastic resin emulsions having the glass transition temperature Tg of lower than 60° C., had only a low resistance to blocking. In the Comparative Examples 2 and 6 employing the film forming assistant agent exhibiting the solubility to water in excess of 20 g/100cc, occurred in the coating, and spot rusting was seen to occur at the time of the tests for resistance to salt spray corrosion.

In the Comparative Example 3 in which a film forming assistant agent having solubility of water therein of lower than 0.5g/100cc, the composition was thickened and separated during storage, while spot rusting occurred in the tests on resistance to salt spray corrosion.

In the Comparative Example 4 in which the componennt (B) was employed in excess in terms of the ratio of the solid resin of the component (A) to that of the component (B), the adhesive strength after ageing was lowered significantly.

The composition of the Comparative Example 5 not containing the component (B) had only poor adhesive strength.

We claim:

1. Thermal adhesive coating composition consisting essentially of
   (A) an emulsion of a thermoplastic synthetic resin having a glass transition temperature of not lower than 60° C.,
   (B) an emulsion of an epoxy resin,
   (C) an amine base curing agent for the epoxy resin, said curing agent being capable of reacting with said component (B) when heated, and
   (D) a film forming assistant agent having solubility in water at 20° C. of not higher than 20g/100cc and having solubility therein of water at 20° C. of not lower than 0.5g/100cc, the weight ratio of the solid resin contents in said component (A) to those in said component (B) being 60/40 to 98/2.

2. The thermal adhesive coating composition according to claim 1 wherein the said emulsion of the thermoplastic synthetic resin is an emulsion of poly(meth)acrylate copolymer.